United States Patent
Blum

(10) Patent No.: US 9,266,992 B2
(45) Date of Patent: Feb. 23, 2016

(54) POLYURETHANE COATING AGENT

(76) Inventor: Holger Blum, Teufen (CH)

(*) Notice: Subject to any disclaimer, the term of this patent is extended or adjusted under 35 U.S.C. 154(b) by 255 days.

(21) Appl. No.: 13/808,548

(22) PCT Filed: Jul. 5, 2010

(86) PCT No.: PCT/EP2010/003988
§ 371 (c)(1),
(2), (4) Date: Jan. 23, 2013

(87) PCT Pub. No.: WO2012/003843
PCT Pub. Date: Jan. 12, 2012

(65) Prior Publication Data
US 2013/0123425 A1 May 16, 2013

(51) Int. Cl.
C08G 18/08 (2006.01)
C08G 18/22 (2006.01)
C08G 18/28 (2006.01)
C08L 75/00 (2006.01)
C08K 3/10 (2006.01)
C08K 3/08 (2006.01)
C08K 3/18 (2006.01)
C08K 3/22 (2006.01)
C09D 5/38 (2006.01)
C08G 18/48 (2006.01)
C09D 175/08 (2006.01)
C08K 5/101 (2006.01)
C08K 3/00 (2006.01)
C09D 175/04 (2006.01)
C08G 18/58 (2006.01)
C08G 18/76 (2006.01)
C08G 18/32 (2006.01)
C08K 5/00 (2006.01)

(52) U.S. Cl.
CPC .......... *C08G 18/222* (2013.01); *C08G 18/3215* (2013.01); *C08G 18/48* (2013.01); *C08G 18/58* (2013.01); *C08G 18/7664* (2013.01); *C08K 3/0033* (2013.01); *C08K 5/101* (2013.01); *C09D 175/04* (2013.01); *C09D 175/08* (2013.01); *C08K 5/0091* (2013.01)

(58) Field of Classification Search
CPC ...... C08G 18/222; C08G 18/58; C08G 18/48; C08G 18/3215; C08G 18/7664; C08K 3/0033; C08K 5/0091; C08K 5/101; C09D 175/04; C09D 175/08
USPC ......... 524/430, 437, 439, 441, 589, 590, 906, 524/907; 528/56
See application file for complete search history.

(56) References Cited

U.S. PATENT DOCUMENTS

| | | | |
|---|---|---|---|
| 2,312,088 A | 2/1943 | Fleming | |
| 3,539,424 A * | 11/1970 | Tashlick | 156/238 |
| 3,901,688 A | 8/1975 | Casey et al. | |
| 3,907,608 A | 9/1975 | Barrett et al. | |
| 4,026,710 A | 5/1977 | Kennedy | |
| 4,075,152 A * | 2/1978 | Taller | 524/599 |
| 4,236,934 A | 12/1980 | Bell | |
| 5,180,773 A * | 1/1993 | Dalibor | 524/853 |
| 2006/0293486 A1* | 12/2006 | Emmrich et al. | 528/44 |

FOREIGN PATENT DOCUMENTS

| | | |
|---|---|---|
| JP | 60-71625 A | 4/1985 |
| WO | 2010/057824 A1 | 5/2010 |

OTHER PUBLICATIONS

International Search Report for PCT Application No. PCT/EP2010/003988 dated Mar. 17, 2011.

* cited by examiner

*Primary Examiner* — Patrick Niland
(74) *Attorney, Agent, or Firm* — Nixon Peabody LLP; Joseph Bach

(57) ABSTRACT

The invention relates to a component set for producing a polyurethane coating agent that can be cured by a chemical isocyanate reaction, at least comprising (A) a liquid reaction component A containing the polyhydroxyl compound of the polyurethane binder, (B) a liquid reaction component B containing the polyisocyanate for cross-linking the polyhydroxyl compound, wherein an inorganic filler is contained in components A and/or B, and wherein the reaction components A and/or B contain a volatile compound of formula (I), where R2, R3, R4=the methyl or ethyl group, and (C) component C as a separately provided flow agent and catalyst, said component C containing a titanium compound of formula Ti(OR)x(OCOR1)y, where R1=C1 to C8 hydrocarbon group; R1=C10-C18 hydrocarbon group; x=1 or 2; y=2 or 3; x+y=4. The invention further relates to a method for producing a polyurethane coating agent and to the use of the set of components to produce a polyurethane coating agent.

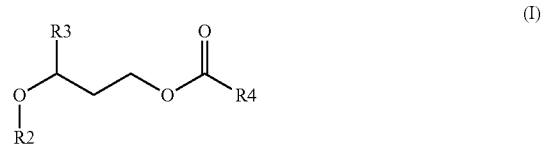

(I)

17 Claims, No Drawings

POLYURETHANE COATING AGENT

RELATED APPLICATIONS

This application is a National Phase of International Application No. PCT/EP2010/003988, entitled "POLYURETHANE COATING AGENT", which was filed on Jul. 5, 2010, and the disclosure of which is hereby incorporated by reference in its entirety.

The invention relates to a component set for producing a polyurethane coating agent, a method for producing a polyurethane coating agent and the use of the component set for producing a polyurethane coating agent.

The application of liquid coatings having inorganic fillers encounters difficulties because, due to the suspended particles, the spreading of the coating agent is inadequate and differing depending on the geometry of the sub-surfaces to be coated. In order to avoid such disturbances, one was forced, up to now, to use a relatively high portion of liquid solvents or to substitute a part of the flakey pigments by ball-shaped pigments, see for example U.S. Pat. No. 2,312,088; U.S. Pat. No. 3,901,688; U.S. Pat. No. 3,907,608; U.S. Pat. No. 4,026,710 and U.S. Pat. No. 4,236,934.

JP 60071625 A teaches that one can improve the flow behavior of highly filled two component polyurethane coatings by adding 0.1 to 5% titanium-IV-compounds of the Formula Ti(OR)x(OCOR1)y(OCOZNH2)z, wherein R=C3-C8 hydrocarbon group; R1=C1-C18 hydrocarbon group; Z=C1 to C8 hydrocarbon group; x, y, z=1 or 2; x+y+z=4, thereby that these titanium compounds reduce the viscosity of the liquid coating agent. Thereby, liquid coating agents having a low initial viscosity are obtained which, however, are quickly thickening and gelating because the titanium compound used accelerates the reaction of the isocyanate with the hydroxyl component remarkable. As a result, the potlife of the liquid polyurethane coating agent based on the JP 60071625 A is too short for the practical usage.

It is an object of the invention, to provide a component set for producing a polyurethane coating agent, a method for producing a polyurethane coating agent and the use of the set of components to produce a polyurethane coating agent, wherein a long potlife, a short drying time and a good flowability is to be achieved upon the application to a horizontal, plane surface.

For this purpose, the inventive component set for producing a polyurethane coating agent is characterized as stated in claim 1, the inventive method is characterized as stated in claim 14, and the use of the components is characterized as stated in claim 16. Advantageous embodiments of the invention are characterized in the sub-claims.

It has been found that a binder having a poor solvent content and low viscosity for a polyurethane coating agent which includes an inorganic filler with high volume and has a long potlife, comprises:

A) a liquid reaction component A containing the polyhydroxyl compound of the polyurethane binder as well as the flakey pigments, B) a liquid reaction component B containing the polyisocyanate for crosslinking the polyhydroxyl compound;

C) a liquid flow agent and catalyst compound C containing a titanium compound of the Formula I $$Ti(OR)_x(OCOR1)_y \qquad \text{Formula I}$$

wherein R=C1-C8; R1=C10-C18 hydrocarbon group; x=1 or 2; y=2 or 3; x+y=4, as a separate third component, D) a volatile compound of the Formula II

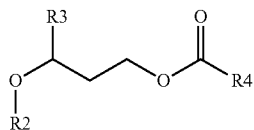

Formula II wherein R2, R3, R4=methyl or ethyl rest.

It has been found that the volatile compound delays the catalytic isocyanate—hydroxyl reaction of the titanium compound mentioned under 2) of the Formula I Ti(OR)x (OCOR1)y without impairing the ability for the improvement of the flowability.

It is assumed that the reason is the formation of a chelate complex of the following Formula IIa

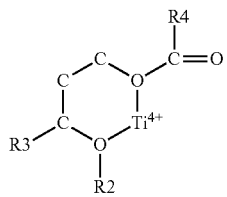

which reversibly originates from the titanium compound of the Formula I and the volatile compound of the Formula II serving as a bidentate ligand.

Only after the vaporization of the volatile component of the Formula II from the coating agent applied to the sub-surface, the reaction accelerating effect of the titanium compound of the Formula I is not delayed any longer since the chelate complex is not present anymore, and a fast isocyanate hardening of the coating agent is encountered.

In an advantageous way, the organic filler in the inventive polyurethane coating agent is a flakey or lamellar pigment. Coatings having exclusively flakey pigments comprise a higher resistance against mechanical stress and effect an elevated corrosion protection of the coated substrate (for example metal surfaces). In general, there is the tendency that the spreading of the coating agent is inadequate and differing depending on the geometry of the sub-surfaces to be coated because of the agglomerate structure of the suspended particles. However, this tendency is suppressed by the invention in an advantageous way.

The volatile compound of the Formula II is, in advantageous way, included in the component A and/or the component B so that only the three components A and B and C have to be mixed with each other prior to applying the coating agent.

The volatile compound of the Formula II is not to be included in the component C since, as has been found, such a mixture is not stable during storage and the titanium compound of the Formula I is decomposed by the volatile compound of the Formula II which is to be noticed by chemical decomposition of the titanium compound being of low solubility.

The component A can, additionally contain additives and solvents as they are common in the paint industry.

The component A of the coating agent contains flakey or lamellar pigments out of metals, for example aluminum and zinc. The flakey pigments may also be non-metallic and consist, for example, out of glass or aluminum oxide or out of graphite whereby an elevated chemical resistance of the coating is achieved.

In a particularly advantageous way of the embodiment of the invention, the polyhydroxyl compound of the component A consists out of the reaction product of bisphenol A of the Formula III

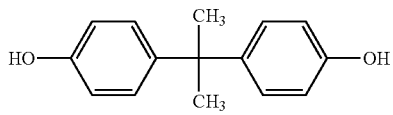

Formula III comprising propylenoxide as a low molecular diol with predominantly secondary hydroxyl groups. By means of the presence of the predominantly secondary hydroxyl groups, the potlife of the coating is prolonged.

In a particularly advantageous way of the embodiment of the invention, the polyhydroxyl compound of the reaction component A consists out of the reaction product of bisphenol A of the Formula III

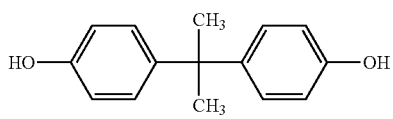

Formula III with epichlorohydrine in an alkali environment as a polyol with predominantly secondary hydroxyl groups and additional epoxy groups. The additional epoxy groups cause a better cross-linking and adhesion of the coating upon applying it to the sub-surface.

In a particularly advantageous way of the embodiment of the invention, the polyisocyanate compound of the reaction component B comprises the structure according to the following Formula IV

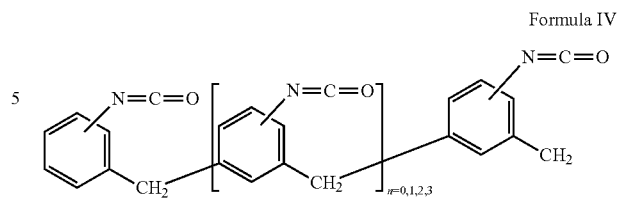

Formula IV wherein n=0 to 3.

This liquid substance is known as technical, polymeric diphenylmethandiisocyanate (PMDI) and has the CAS number 9016-87-9. This kind of polymeric isocyanate causes a complete hardening and crosslinking of the coating also at low temperatures during usage.

In a particularly advantageous way of the embodiment of the invention, the titanium compound of the Formula I Ti(OR)x(OCOR1)y comprises the structure according to Formula V

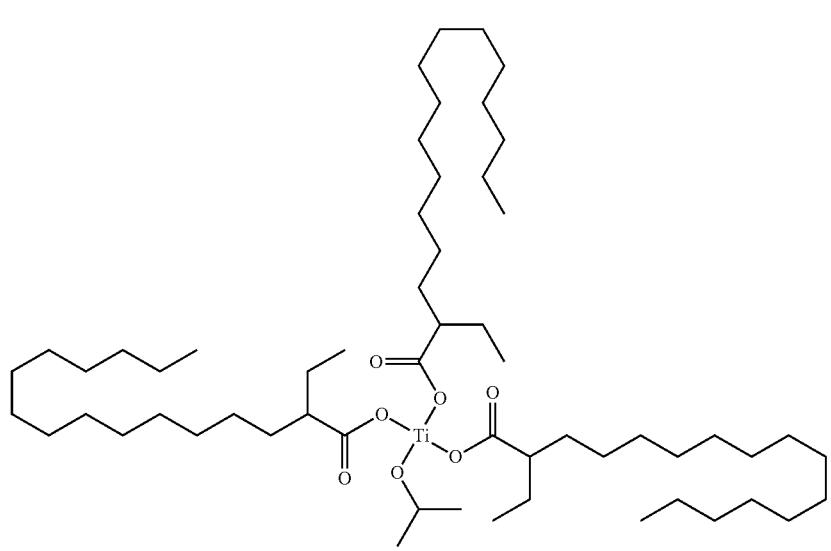

Formula V

This corresponds to the chemical designation tris(isooctadecanoato-O-)(propan-2-olato)titanium and the CAS number 61417-49-0. This kind of titanium compound comprises a high reaction accelerating effect as isocyanate-hydroxyl catalyst combined with very good boarder surface effectiveness because of the long, non-polar hydrocarbon chain of the isostearin acid.

The component C comprises, in an advantageous way, 1-10 percent by volume of the titanium compound of the Formula I solved in a liquid hydrocarbon agent. It is furthermore preferred that the volatile hydrocarbon compound is an aromatic hydrocarbon with 5-9 carbon atoms.

In a particularly advantageous embodiment of the invention, the volatile compound of the Formula II comprises the structure according to Formula VI:

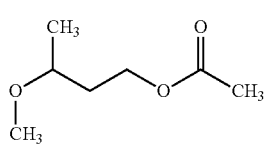

Formula VI

This corresponds to the chemical designation 3-methoxy-1-butylacetat and the CAS number 4435-53-4. This compound comprises very good volatility.

The inventive method for producing a polyurethane coating agent being cross linkable by chemical isocyanate reaction, comprises the steps: (A) providing a liquid reaction component A containing the polyhydroxyl compound of the polyurethane binder agent, (B) providing a liquid reaction component B containing the polyisocyanate for crosslinking the polyhydroxyl compound, wherein a flakey or lamellar pigment is contained in the component A and/or B, and wherein the reaction components A and/or B contain a volatile compound of the Formula II, wherein R2, R3, R4=denote the methyl or ethyl group, as well as (C) providing a titanium compound of the Formula I wherein R=C1 to C8 hydrocarbon group; R1=C10-C18 hydrocarbon group; x=1 or 2; y=2 or 3; x+y=4, as a separate flow agent and catalyst component C, and (D) mixing the components (A) to (C) together immediately prior to the usage of the coating agent.

An embodiment of the method is characterized in that, at first, the components A and C are mixed together and that, thereafter, the component B is mixed to the mixture out of the components A and C. Thereby, after short steering of the coating agent, a well flowing mass is resulting free of inhomogeneities in a particularly advantageous way The invention is now explained with respect to the following examples.

EXAMPLE 1

Reaction component A: 70 parts by weight bisphenol A propylenoxide diol having an OH number of 285, are solved in 25 parts by weight xylol. In this solution which contains hydroxyl groups, 85 parts by weight of finely milled, flakey zinc and 40 parts by weight of finely milled, flakey aluminum are suspended while steering.

Reaction component B: 80 parts by weight polymeric diphenylmethandiisocyanate of the Formula IV with a content of reactive isocyanate groups of 31 parts by weight are mixed with 20 parts by weight of 3-methoxy-1-butylacetate (Formula VI).

Liquid flow agent and catalyst component C: 1 mole of isopropyltitanate, CAS number 546-68-9, have been steered with 3 moles isostearin acid, CAS number 30399-84-9 during three days at 60° C. under a nitrogen atmosphere.

The liquid, dark red homogenous reaction product of the Formula I with x=1 and y=3 was freed at 60° C. under vacuum and while passing nitrogen, to a large degree of the released isopropylalcohol, and provided one mole of technically clean tris-(isooctadecanoato-O-) (propan-2-olato)titanium with the CAS number 61417-49-0.

For producing a liquid flow agent and catalyst component C, one 1 part by volume of this titanium IV component was mixed with 99 parts by volume of xylol.

For usage, 20 parts by weight of the reaction component A were thoroughly mixed prior to the application with one part of weight of liquid flow agent and catalyst component C. To this intermediate mixture, so many parts by weight of component B are subsequently added while steering so that the ready coating mass contains 1.25 mole isocyanate groups per mole of free hydroxyl groups.

The readily mixed coating agent was applied by means of a roller to a horizontal steel plate stored outdoors at 14° C., and the flow characteristic of the coating agent was judged according to the follow measurement scale:
Flow number 1=no roller strips, smooth flow
Flow number 2=some roller strips, smooth flow
Flow number 3=roller strips are leveling out at about 50% of the coated surface
Flow number 4=roller strips level out at about 20% of the coated surface
Flow number 5=roller strips are not leveling out The inventive coating agent according to example 1 comprises the following handling characteristics:
Potlife of the mixture: 4 hours
Hardening of the coating agent up to hand dryness: 2 hours
Flow characteristic: flow number 1 to 2

EXAMPLE 2

Reaction component A: 70 parts by weight bisphenol A propylenoxide diol having an OH number of 285, are solved in 25 parts by weight xylol. In this solution which contains hydroxyl groups, 85 parts by weight of finely milled, flakey zinc and 40 parts by weight of finely milled, flakey aluminum are suspended while steering.

Reaction component B: 80 parts by weight polymeric diphenylmethandiisocyanate of the Formula IV with a content of reactive isocyanate groups of 31 parts by weight are mixed with 20 parts by weight of 3-methoxy-1-butylacetate (Formula VI).

Liquid flow agent and catalyst component C: 1 part by volume of liquid tris(isooctadecanoato-O-) (propan-2-olato) titanium was solved in 99 parts by volume of xylol.

For usage, 20 parts by weight of the reaction component A were thoroughly mixed prior to the application with 1 part of weight of liquid flow agent and catalyst component C. To this intermediate mixture, so many parts by weight component B are subsequently added while steering that the ready coating mass contains 2 moles isocyanate groups per mole of free hydroxyl groups.

The readily mixed coating agent was applied by means of a roller to a horizontal steel plate stored outdoors at 14° C., and the flow characteristic of the coating agent was judged according to the measurement scale mentioned in example 1:

The inventive coating agent according to example 2 comprises the following handling characteristics:
Potlife of the mixture: 3 hours
Hardening of the coating agent up to hand dryness: 2 hours
Flow characteristic: flow number 1

EXAMPLE 3

Reaction component A: 70 parts by weight bisphenol A propylenoxid diol having an OH number of 285, are solved in 10 parts by weight of xylol and 15 parts by weight 3-methoxy-1-butylacetate. In this solution which contains hydroxyl groups, 85 parts by weight of finely milled, flakey zinc and 40 parts by weight of finely milled, flakey aluminum are suspended while steering.

Reaction component B: 80 parts by weight polymeric diphenylmethandiisocyanate of the Formula IV with a content of reactive isocyanate groups of 31 parts by weight are mixed with 20 parts by weight of 3-methoxy-1-butylacetate (Formula VI).

Liquid flow agent and catalyst component C: 1 part by volume of liquid tris(isooctadecanoato-O-) (propan-2-olato) titanium was solved in 99 parts by volume of xylol.

For usage, 20 parts by weight of the reaction component A were thoroughly mixed prior to the application with 1 part by weight of liquid flow agent and catalyst component C. To this intermediate mixture, so many parts by weight of component B are subsequently added while steering that the ready coating mass contains 1.25 mole isocyanate groups per mole of free hydroxyl groups.

The ready mixed coating agents was applied by means of a roller to a horizontal steel plate stored outdoors at 14° C., and the flow characteristic of the coating agent was judged according to the measurement scale mentioned in example 1:

The inventive coating agent according to example 3 comprises the following handling characteristics:
Potlife of the mixture: 4 hours
Hardening of the coating agent up to hand dryness: 2 hours
Flow characteristic: flow number 1 to 2

EXAMPLE 4

Reaction component A: 50 parts by weight bisphenol A epichlorohydrine condensate having an epoxyed adequate weight of 480, are solved in 50 parts by weight 2-nitropropan. In this solution which contains hydroxyl groups, 30 parts by weight of finely milled, flakey glass flakes are suspended while steering.

Reaction component B: 80 parts by weight polymeric diphenylmethandiisocyanate of the Formula IV with a content of reactive isocyanate groups of 31 parts by weight are mixed with 20 parts by weight of 3-methoxy-1-butylacetate.

Liquid flow agent and catalyst component C: 1 part by volume of liquid tris(isooctadecanoato-O-) (propan-2-olato) titanium was solved in 99 parts by volume of xylol.

For usage, 20 parts by weight of the reaction component A were thoroughly mixed prior to the application with 1 part of weight of liquid flow agent and catalyst component C. To this intermediate mixture, so many parts by weight component B are subsequently added while steering that the ready coating mass contains 2 mole isocyanate groups per mole of free hydroxyl groups.

The ready mixed coating agents was applied by means of a roller to a horizontal steel plate stored outdoors at 14° C., and the flow characteristic of the coating agent was judged according to the measurement scale mentioned in example 1:

The inventive coating agent according to example 4 comprises the following handling characteristics:
Potlife of the mixture: 5 hours
Hardening of the coating agent up to hand dryness: 2 hours
Flow characteristic: flow number 1

EXAMPLES 5 to 8

Coatings with the material and quantity characteristics according to example 1 were prepared with the only difference that the 3-methoxy-1-butylacetat in the reaction component B was replaced by other liquid materials. The components obtained like that, were mixed and applied to a horizontal steel plate stored outdoors at 14 degrees Celsius by a roller, and the flow characteristic of the coating agent was judged according to the measurement scale mentioned in example 1:

The results are given in the following Table I.

| Example number | Volatile component in reaction component B | Flow number | Potlife (hours) | Hand dry time (hours) |
|---|---|---|---|---|
| 1 | 3-methox-1-butylacetate | 1 to 2 | 4 | 2 |
| 5 | n-butyl-acetate | 3 | 2 | 2 |
| 6 | 2-methoxy-1-ethylacetate | 3 to 4 | 2 | 2 |
| 7 | 2-methoxy-1-propylacetate | 4 | 2 | 3 |
| 8 | xylol | 4 | 1 | 2 |

As can be seen from Table 1, only the use of 3-methoxy-1-butylacetat (Formula II R2, R3, R4=methyl) in combination with the titanium ester of the Formula I bring about a good flow characteristic of the coatings combined with a sufficiently long potlife and combined with a short drying time.

As a result, the inventive example 1 to 4 provide a polyurethane coating agent with exclusively flakey pigments which comprise the advantageous combination of a long potlife, a short drying time and a good flow characteristic upon applying it to horizontal, plane surfaces.

COMPARATIVE EXAMPLE 1

Omitting the titanium ester of the Formula I and the 3-methoxy-1-butylacetate (volatile compound of the Formula II R2, R3, R4=methyl):

Reaction component A: 70 parts by weight bisphenol A diol with OH number of 285 are solved in 25 parts by weight of xylol. In this solution which contains free hydroxyl groups, 85 parts by weight of finely milled, flakey zinc and 40 parts by weight of finely milled, flakey aluminum are suspended while steering.

Reaction component B: 80 parts by weight of polymeric diphenylmethandiisocyanate of the Formula IV with a content of reactive isocyanate groups of 31 parts by weight are mixed with 20 parts by weight of xylol.

For usage, so many parts by weight of the reaction component B are added to the reaction component A while steering that the readily prepared coating agent contains 1.23 mole isocyanate groups per mole of free hydroxyl group.

The readily mixed coating was applied by means of a roller to a horizontal steel plate stored outdoors at ° C., and the flow characteristic of the coating agent was judged according to the measurement scale mentioned in example 1.

The coating of the comparative example 1 has shown the following handling characteristics:
Potlife of the mixture: 2 hours
Hardening of the coating agent up to hand dryness: 5 hours
Flow characteristic: flow number 4

COMPARATIVE EXAMPLE 2

The effect of the titanium compound of the JP 60071 625 A was checked:

For the production, 1 mole isopropyltitanate, CAS number 546-68-9, was steered with 2 moles isostearins acid, CAS number 30399-84-9 and 1 mole p-aminobenzoin acid, CAS number 150-13-0, for three days at 60° C. under nitrogen atmosphere.

The liquid, dark, homogenous reaction product was freed at 60° C. under vacuum and while introducing nitrogen to a large extend from the released isopropylalcohol, and it provided 1 mole technically clean bis(isooctadecanoato-O-)(propan-2-olato)titanium IV paminobenzoate with the CAS number 98299-77-5.

For producing a liquid flow agent and catalyst component C, 1 part by volume of this titanium-IV-compound was mixed with 99 parts by volume of xylol.

Reaction component A: 70 parts by weight bisphenol A propylenoxid diol with OH number of 285, was solved in 25 parts by weight of xylol. In this solution which contains free hydroxyl groups, 85 parts by weight of finely milled, flakey zinc and 40 parts by weight finely milled, flakey aluminum was suspended while steering.

Reaction component B: 80 parts by weight of polymeric diphenylmethandiisocyanate of the Formula IV having a content of reactive isocyanate groups of 31 parts by weight are mixed with 20 parts by weight of 3-methoxy-1-butylacetat.

For use, 20 parts by weight of the reaction component A are thoroughly mixed prior to the application with 1 part by weight of liquid flow agent and catalyst component C. To this intermediate mixture, subsequently so many parts by weight of reaction component B are added while steering that the readily prepared coating agent contains 1.25 mole isocyanate groups per mole of free hydroxyl group.

The readily mixed coating was applied by means of a roller to a horizontal steel plate stored outdoors at 14° C., and the flow characteristic of the coating agent was judged according to the measurement scale mentioned in example 1.

The coating of the comparative example 2 has shown the following handling characteristics:
Potlife of the mixture: 2 hours
Hardening of the coating agent up to hand dryness: 2 hours
Flow characteristic: flow number 2 to 3

COMPARATIVE EXAMPLE 3

Reaction component A: 70 parts by weight bisphenol A propylenoxid diol with an OH number of 285, was solved in 25 parts by weight of xylol. In this solution which contains free hydroxyl groups, 85 parts by weight of finely milled, flakey zinc and 40 parts by weight of finely milled, flakey aluminum was suspended while steering. Subsequently, 20 parts by weight of a solution consisting of 1 part by volume tris-(isooctadecanoato-O-)(propan-2-olato)titanium, Formula V, in 99 parts by volume xylol was added to the pigment suspension while continuously steering. Prior to the use, the reaction component A was stored during one month at room temperature.

Reaction component B: 80 parts by weight of polymeric diphenylmethandiisocyanate of the Formula IV having a content of reactive isocyanate groups of 31 parts by weight was mixed with 20 parts by weight of 3-methoxy-1-butylacetat, Formula VI.

For use, so many parts by weight of the reaction component B were added to reaction component A while steering that the ready provided coating agent contains 1.25 mole isocyanate groups per mole of free hydroxyl group.

The readily mixed coating was applied by means of a roller to a horizontal steel plate stored outdoors at 14° C., and the flow characteristic of the coating agent was judged according to the measurement scale mentioned in example 1.

The coating of the comparative example 3 has shown the following handling characteristics:
Potlife of the mixture: 3 hours
Hardening of the coating agent up to hand dryness: 2 hours
Flow characteristic: flow number 4

This comparative example shows that the component C can only be added immediately prior to the mixing of the coating agent. Otherwise, the desired effect is not pronounced. It is assumed that the titanium compound dissolves slowly, i.e. within several weeks in the pigment mixture.

The invention claimed is:

1. Component set for producing a polyurethane coating agent that can be cured by chemical isocyanate reaction, at least comprising:
    A) a liquid reaction component A containing the polyhydroxyl compound of the polyurethane binder as well as the flakey pigments,
    B) a liquid reaction component B containing the polyisocyanate for crosslinking the polyhydroxyl compound; wherein an inorganic filler is contained in the component A and/or B, and wherein the reaction components A and/or B contain a volatile compound of the Formula II

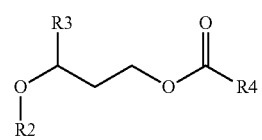

Formula II wherein R2, R3, R4 designate a methyl or ethyl group, as well as
    C) a separately provided flow agent and catalyst component C containing a titanium compound of the Formula I

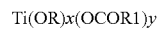

Formula I wherein R=C1-C8; R1=C10-C18 hydrocarbon group; x=1 or 2; y=2 or 3; x+y=4;
    and wherein
    the polyhydroxyl compound of the component A consists of the reaction product of bisphenol A of the Formula III

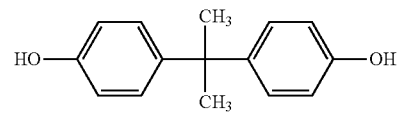

with polypropylenoxide as a low molecular diol with predominantly secondary hydroxyl groups.

2. Component set according to claim 1, wherein the weight content of the titanium compound of the Formula I in the liquid, ready to be applied coating amounts to 200 to 5.000 ppm.

3. Component set according to claim 1, wherein the weight content of the volatile compound of the Formula III in the liquid, ready to be applied coating amounts to 3 to 10 percent by volume.

4. Component set according to claim 1, wherein component A contains flakey and lamellar pigments out of metals.

5. Component set according to claim 1, wherein the flakey pigments consists of a non-metallic material selected from the group consisting of glass, aluminum oxide and graphite.

6. Component set according to claim 1, wherein the polyisocyanate compound of the reaction component B comprises the structure according to the following Formula IV

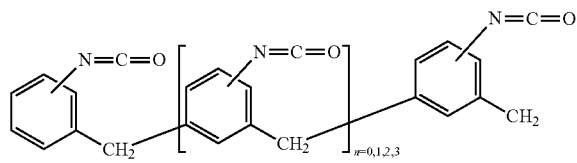

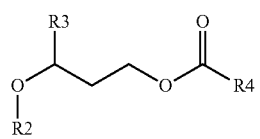

wherein n=0 to 3.

7. Component set according to claim 1, wherein the titanium compound of the Formula I tris(isooctadecanoato-O-)(propan-2-olato)titanium comprises the structure according to Formula V wherein R2, R3, R4 designate a methyl or ethyl group, as well as C) a separately provided flow agent and catalyst component C containing a titanium compound of the Formula I Formula V

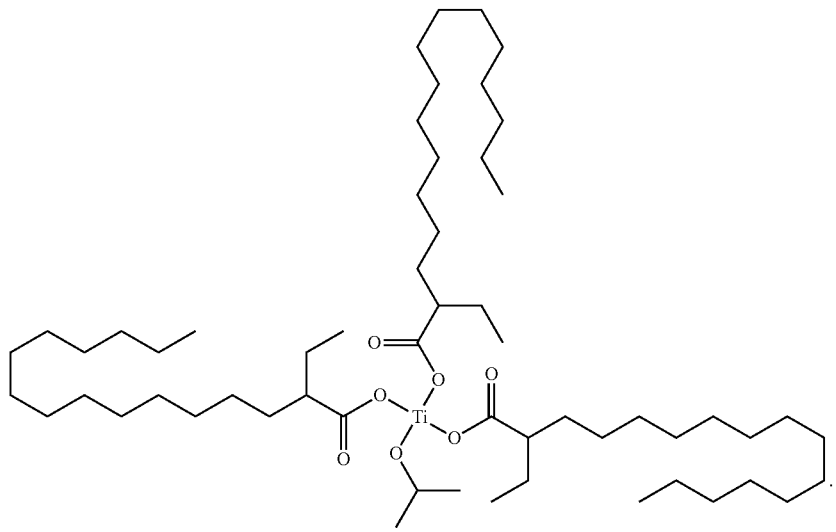

8. Component set according to claim 1, wherein the component C comprises 1-10 percent by volume of the titanium compound of Formula 1 which is solved in a liquid hydrocarbon agent.

9. Component set according to claim 1, wherein the volatile component of the Formula II is 3-methoxy-1-butylacetate having the structure according to Formula VI

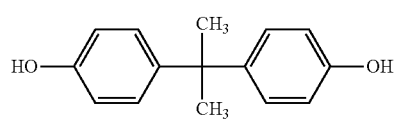 [SMILES: CC(C)(c1ccc(O)cc1)c1ccc(O)cc1]

$Ti(OR)x(OCOR1)y$      Formula I wherein R=C1-C8; R1=C10-C18 hydrocarbon group; x=1 or 2; y=2 or 3; x+y=4, and wherein the polyhydroxyl compound of the reaction component A consists of the reaction product of bisphenol A of the Formula III

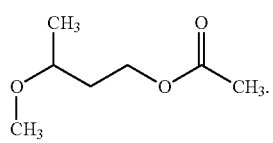

Formula VI with epichlorohydrine in an alkalic environment as a polyol having predominantly secondary hydroxyl groups and additional epoxy groups.

10. Component set for producing a polyurethane coating agent that can be cured by chemical isocyanate reaction, at least comprising:

A) a liquid reaction component A containing the polyhydroxyl compound of the polyurethane binder as well as the flakey pigments, B) a liquid reaction component B containing the polyisocyanate for crosslinking the polyhydroxyl compound; wherein an inorganic filler is contained in the component A and/or B, and wherein the reaction components A and/or B contain a volatile compound of the Formula II 11. Component set according to claim 10, wherein the weight content of the titanium compound of the Formula I in the liquid, ready to be applied coating amounts to 200 to 5.000 ppm.

12. Component set according to claim 10, wherein the weight content of the volatile compound of the Formula III in the liquid, ready to be applied coating amounts to 3 to 10 percent by volume.

13. Component set according to claim 10, wherein component A contains flakey and lamellar pigments out of metals.

14. Component set according to claim 10, wherein the flakey pigments consist of a non-metallic material selected from the group consisting of glass, aluminum oxide and graphite.

15. Component set according to claim 10, wherein the titanium compound of the Formula I tris(isooctadecanoato-O-)(propan-2-olato)titanium comprises the structure according to Formula V

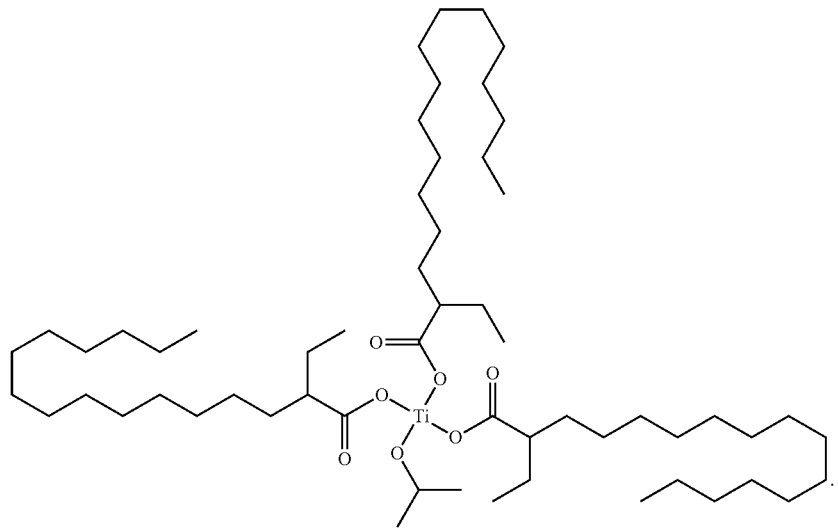

Formula V

16. Component set according to claim 10, wherein the component C comprises 1-10 percent by volume of the titanium compound of Formula 1 which is solved in a liquid hydrocarbon agent.

17. Component set according to claim 10, wherein the volatile component of the Formula II is 3-methoxy-1-butylacetate having the structure according to Formula VI Formula VI

* * * * *